United States Patent [19]

Skinner et al.

[11] 4,342,793

[45] Aug. 3, 1982

[54] INTERPENETRATING DUAL CURE RESIN COMPOSITIONS

[75] Inventors: Earl Skinner, Wayzata; Marvin Emeott, Lake Elmo; Allan Jevne, Anoka, all of Minn.

[73] Assignee: Henkel Corporation, Minneapolis, Minn.

[21] Appl. No.: 191,802

[22] Filed: Sep. 29, 1980

Related U.S. Application Data

[63] Continuation of Ser. No. 945,370, Sep. 25, 1978, abandoned, which is a continuation of Ser. No. 759,311, Jan. 14, 1977, Pat. No. 4,128,600.

[51] Int. Cl.$^3$ .............................................. B05D 3/06
[52] U.S. Cl. ....................................................... 427/44
[58] Field of Search ................... 528/75; 525/123, 131; 204/159.16, 159.19; 427/44

[56] References Cited

U.S. PATENT DOCUMENTS

| | | | |
|---|---|---|---|
| 3,509,234 | 4/1970 | Burlant | 525/126 |
| 3,719,638 | 3/1973 | Huemmer | 525/126 |
| 3,776,729 | 12/1973 | Levy | 204/159.15 |
| 3,929,929 | 12/1975 | Kuehn | 260/859 R |
| 4,025,346 | 5/1977 | Petke | 204/159.19 |
| 4,034,017 | 7/1977 | Chang | 528/45 |

FOREIGN PATENT DOCUMENTS 1450288 9/1976 United Kingdom .

*Primary Examiner*—Paul R. Michl
*Attorney, Agent, or Firm*—Forrest L. Collins; Patrick J. Span

[57] ABSTRACT

Curable resin compositions are prepared containing a radiation-sensitive reactive diluent and a saturated polyol. Curing is accomplished by mixing the reactive diluent and the polyol with a polyisocyanate, followed by exposure of the resultant composition to radiation to polymerize the reactive diluent and then, by thermal curing, to form the hydroxyisocyanate (urethane) linkage. The fully cured resin composition is described as interpenetrated or one in which there is no cross-linking between the reactive diluent and urethane linked copolymer. The interpenetrated resin compositions form tough and hard coatings on various substrates.

12 Claims, No Drawings

INTERPENETRATING DUAL CURE RESIN COMPOSITIONS

This is a continuation of application Ser. No. 945,370, filed Sept. 25, 1978, abandoned, which is a continuation of Ser. No. 759,311, filed Jan. 14, 1977, now U.S. Pat. No. 4,128,600.

BACKGROUND OF THE INVENTION

1. Field of the Invention

This invention relates to resin compositions having utility as protective, transparent or translucent coatings for various substrate materials such as wood, paper, metal and plastics.

2. Description of the Art

The field of coating materials has undergone tremendous changes in recent years. One primary concern in the coating industry is the need to lower the emission of volatile hydrocarbons into the air. Under prior practices, coating compositions which are highly viscous were cut with a compatible solvent, such as benzene, toluene or xylene. These solvents aided in processing the coating composition during manufacture and in application to substrates.

In the curing of the coating, that is, the chemical bonding of the various components to form a polymer, the solvent is driven off by the thermal energy used to effect curing. As the thermal curing operation is ordinarily carried out by any number of end consumers, the resultant air quality in the consumer's plant and the atmosphere will depend on the steps which the consumer employs to trap the volatile emissions.

It should also be recognized that a considerable amount of thermal energy is expended in driving off volatile solvents. Aside from cost considerations, the necessary thermal energy to drive off the solvent may cause an undesirable side reaction in the coating or upon the substrate. This problem could be solved by gradually applying the thermal energy to the coated substrate, but with additional time required for the cure. Moreover, the cure rate is essentially independent of the energy required to drive off the solvent. Thus, the cured coating may entrain the solvent, giving rise to a poor coating, e.g. bubbles.

The problem facing the coating industry is, therefore, to provide a resin composition having the desirable properties of former resin compositions, but not containing a volatile solvent which is emitted into the atmosphere during the thermal curing step.

Smith, et al, in U.S. Pat. No. 3,935,330 issued Jan. 27, 1976, suggested a coating composition containing, as required components, a reactive thermoset cross-linker and a reactive solvent which is both thermal and radiation sensitive. Exemplary of the thermoset crosslinkers disclosed in Smith et al are polyfunctional oxiranes, urea/formaldehyde resins and melamine/formaldehyde resins. The reactive solvents are generally described as materials containing both a vinyl polymerizable double bond and a functional group which is reactive under thermal activation.

The oligomers formed through the processing described in Smith et al are fully cross-linked or a penetrated resin composition. That is, the oligomers are a single, continuous complex randomly formed through the common thermosetting functional group. This patent also contemplates the addition of materials which will function to increase the molecular weight of the reactive solvent in the radiation curing step. These latter materials which are called radiation sensitive reactive components will copolymerize through a vinyl radical with the reactive solvent. The resultant copolymer which still maintains its thermal curing functionality then forms a higher molecular weight oligomer with the reactive thermoset crosslinker.

The deficiency in the compositions disclosed by Smith et al lies in the properties of the penetrated oligomer. Specifically, the fact that the oligomer contains at least two thermosetting components and up to two different vinyl containing components leads to a considerable variance in the physical properties of oligomer. That is the variance in the molecular weight of the reactive solvent following the radiation cure must be considered in formulating the end product (oligomer). Similarly, the structure and molecular weight of the reactive solvent must be factored if the additional radiation sensitive component is present to predict the properties of the oligomer. Moreover, the final structure of the penetrated oligomer will vary considerably, if the reactive solvent has not been sufficiently cured by the radiation. That is, the reactive solvent is fully capable of undergoing thermal crosslinking even in the absence of any radiation curing. While this tends to lessen volatility when the radiation cure is incomplete the result is an unpredictably structured oligomer.

U.S. Pat. No. 3,028,367 issued Apr. 3, 1962 to O'Brion teaches the formation of thermosetting resins comprising a copolymer of a hydroxy alkyl acrylate and an alkyl acrylate together with a dihydric or trihydric alcohol and an organic diisocyanate. Organic thiol compounds are shown as useful in controlling the molecular weight of the copolymer portion of the resin. The copolymer which is hydroxy functional is preferably prepared using a free radical liberating agent in the presence dimethylformamide as a solvent. The solvent is removed following the preparation of the copolymer. The final resin composition is then prepared by reacting the copolymer with the alcohol and the isocyanate. Apparently the copolymer is of sufficiently low molecular weight that no solvent is required to lower the viscosity during application to a substrate.

Shur et al in U.S. Pat. No. 3,772,062 issued Nov. 13, 1973 discloses fiber-board coating compositions which are fully cured by actinic radiation. That is, the compositions are penetrating to the extent that all the components contain acrylic groups which are subject to free radical initiated bonding. The use of thermal energy for curing is stated to be avoided by the reference. The difficulty in attempting to use fully radiation cured resins is the lack of physical strength due to incomplete curing leaving a residue of acrylic monomer in the coating. U.S. Pat. No. 3,776,729 to Levy et al issued Dec. 4, 1973 suggest washing off the non-polymerized monomer following the radiation cure. It is easily observed that fully radiation curable compositions are undesirable unless the cure is complete both from a cost and environmental view. Furthermore the inconsistence in the coating which results where not all the monomer has been cured or washed off can produce a product which will discolor or crack when exposed to later sources of radiation, i.e. sunlight.

It is therefore an object of this invention to prepare a curable coating which is essentially free from solvent emission.

It is a further object of this invention to prepare a curable coating wherein all the components are cured.

It is yet a further object of this invention to prepare a curable coating wherein the radiation sensitive reactive diluent and the thermally curable portion of the composition are interpenetrated.

These and other objects of the invention are fully discussed herein. Throughout the specification and claims temperatures are in centigrade degrees and percentages and ratios are by weight unless otherwise indicated.

SUMMARY OF THE INVENTION

An interpenetrating radiation-sensitive resin composition is prepared comprising:
 (a) from about 40% to about 90% by weight of a saturated polyol; and,
 (b) from about 10% to about 60% by weight of a reactive diluent having a radiation sensitive pi bond and having a boiling point greater than that of benzene;
and mixtures thereof.

A second embodiment of the present invention is an interpenetrating urethane-linking resin composition comprising:
 (a) from about 40% to about 90% by weight of a saturated polyol; and
 (b) from about 10% to about 60% by weight of a reactive diluent selected from the group consisting of the fully substituted polyacrylates and polymethacrylates of poly-functional alcohols, 2-ethylhexyl acrylate, isodecylacrylate, diallyl maleate N-vinyl-2-pyrrolidone, styrene, divinylbenzene and vinyl acetate, and mixtures thereof; and
 (c) from about 80% to about 120% on a hydroxylisocyanate equivalent basis of a polyisocyanate.

Also within the scope of the present invention is the method for forming an interpenetrated urethane linked coating composition on a substrate involving the steps of radiation and thermal curing by:
 (a) preparing a mixture containing:
  (1) from about 40% to about 90% by weight of a saturated polyol; and
  (2) from about 10% to about 60% by weight of a reactive diluent selected from the group consisting of the fully substituted polyacrylates and polymethacrylates of polyfunctional alcohols, N-vinyl-2-pyrrolidone, styrene, 2-ethylhexyl acrylate, isodecyl acrylate, diallyl maleate, divinylbenzene and vinyl acetate and mixtures thereof; and
  (3) from about 80% to about 120% on a hydroxyl-isocyanate equivalent basis of a polyisocyanate;
 (b) applying the mixture to a substrate and subjecting the coating so formed to a sufficient radiation to polymerize the reactive diluent thereby partially curing the coating; and,
 (c) then exposing the partially cured coating of (b) to sufficient thermal energy to form the urethane link, thereby forming the interpenetrated cured coating on the substrate.

DETAILED DESCRIPTION OF THE INVENTION

The present invention contemplates an interpenetrating resin composition which is both radiation and thermally cured. In the contemporary preparation and transportation of polyols for use in curable resins an inert ingredient such as toluene or xylene is included to facilitate processing. One aspect of the present invention deals with the displacement of these volatile inert solvents by distillation. Prior to the distillation process the reactive diluent containing at least one radiation sensitive pi bond is substituted as the carrier or solvent for the polyol.

The reactive diluent should not initially be present with the polyol if the polyol is to be formed through acrylic links in the prepolymer. That is where the polyol is for example a hydroxy-functional copolymer of methyl methacrylate, butyl acrylate, and hydroxyethyl acrylate formed through coupling of the acrylic groups the presence of the reactive diluent initially would result in a copolymer linked to the reactive diluent. In such cases the inert solvent is required until the saturated polyol has been formed and is substantially free of active acrylic (pi bond) groups. Particular examples of forming the saturated polyol from vinyl monomers in the presence of the inert solvent are discussed later in the specification.

Where the reactive diluent would not undergo polymerization through vinyl linkage with the monomers used to form the polyol all the components may be processed to the exclusion of the inert solvent. However, it is still desirable to process the polyol in the presence of the inert solvent as the latter material in any event is a superior to most of the reactive diluents. That is, inert solvents such as toluene provide lower viscosity and thus easier processing of the polyol.

Therefore in most aspects of the present invention a mixture of the saturated polyol and the reactive diluent will be separated from the inert solvent by distillation. The first parameter for the reactive diluent is therefore that it must have a boiling point above that of benzene which is a common inert solvent. More preferably the boiling point of the reactive diluent is greater than that of toluene another suitable inert solvent. For most embodiments the boiling point of the reactive diluent is between about 120° and 300° C. where the upper temperature is reflective of the need to maintain a sufficiently low viscosity of the mixture of the saturated polyol and the reactive diluent. To effect complete removal of the inert solvent by distillation the inert solvent and the reactive diluent should not form an azeotropic mixture.

It is preferred that the reactive diluent be difunctional with respect to the radiation sensitive pi bond functional groups. The difunctionality ensures that cross-linking rather than linear polymerization is obtained during the radiation curing step. The same effect of difunctionality is obtained with a monofunctional reactive diluent if during the radiation cure a sufficient amount of a difunctional reactive diluent is present to ensure some cross-linking. Thus, if monofunctional reactive diluents are utilized a difunctional reactive diluent is preferably present in a weight ratio of from about 4:1 to about 1:4 to the monofunctional reactive diluent. Preferably this ratio is from about 3:1 to about 1:3.

A requirement for the reactive diluent is that it must not contain functional groups which are subject to thermal curing. This condition exists from the advantageous properties of the fully cured interpenetrated polymer. That is the reactive diluent does not contribute greatly to the strength of the cured composition even if the composition is interpenetrated, but where the reactive diluent could chemically bond into the polyol and polyisocyanate structure the overall strength of the cured composition is weakened.

It is also noted that thermally curable functionalities on the reactive diluent would cause the structure of the cured resin to be less predictable. That is the backbone of the polyol is formulated so that repeating units of the polyol is formulated so that repeating units of the various monomers will exist in a particular order. Often this order in the polyol is determined by the processing conditions such as the temperature, presence of catalysts, rate of addition of the monomers, and the duration of the reaction. All of the foregoing must be accomplished in a precise fashion to achieve the copolymer (polyol) which is then cured with the isocyanate.

Therefore any functional group on the reactive diluent which could combine at the conditions under which the polyol is formed or with the polyisocyanate in the final curing operation is to be avoided. Thus the reactive diluent must not contain hydroxyl, amine, carboxyl, primary and secondary amides, or isocyanate functional groups.

Where the polyol is formed by polymerization through a vinyl link (radiation sensitive pi bond) it is understood that the reactive diluent should not be present during polyol formation as the reactive diluent would then undergo a similar reaction leading to undesirable by-products. While the reactive diluent must not contain radicals which would cause the polyol/polyisocyanate resin to become a penetrated system substituents which are non-reactive are permissible. That is the structure of the reactive diluent may contain any such non-reactive radical.

In addition to the foregoing requirements the reactive diluent preferably has a molecular weight of from about 80 to about 800, more preferably about 100 to about 400. Compounds meeting the molecular weight requirement are suitable to lower the viscosity of the polyol.

Examples of monofunctional reactive diluents include the esters of acrylic and methacrylic acid such as methyl acrylate, methyl methacrylate; ethyl acrylate and methacrylate; propyl and isopropyl acrylate and methacrylate; butyl, isobutyl, and tertiary butyl acrylates and methacrylates; n-pentyl and the isopentyl acrylates and methacrylates; n-hexyl and the isohexylacrylates and methacrylates.

Other monofunctional vinyl reactive diluents include the n-heptyl and iso-heptyl acrylates and methacrylates; and octyl and the iso-octyl acrylates and methacrylates. Of this latter category an especially preferred reactive diluent is 2-ethylhexyl acrylate.

Further examples of suitable reactive diluents are the acrylates and methacrylates of the normal and isomeric forms of nonyl, decyl, undecyl, dodecyl, tridecyl and tetradecyl alcohols. Moreover the foregoing esters of acrylic and methacrylic acid may contain non-radiation sensitive unsaturation in the alcohol radical as well.

Additional monofunctional radiation active pi bond compounds which may be used as a reactive diluent include diallyl maleate, diallyl fumarate, vinyl acetate and N-vinyl-2-pyrrolidone, especially the latter compound. The maleate and fumarate compounds actually contain three carbon-carbon pi bonds however only the interior double bond in the maleic (or fumaric) acid backbone is reactive to ultraviolet radiation. Examples of an aromatic monofunctional radiation sensitive pi bond reactive diluents are vinyl toluene and styrene.

The highly preferred reactive diluents of the present invention are those having more than one radiation sensitive pi bond. Such compounds are ordinarily the esters of acrylic or methacrylic acid and a polyhydric alcohol. It will be remembered that when utilizing such reactive diluents that the hydroxyl functionality of the polyhydric alcohol should be fully substituted with the acrylic or methacrylic acid to avoid complete crosslinking (a penetrated polymer) upon addition of the polyisocyanate.

Examples of the foregoing difunctional diluents are ethylene glycol diacrylate and dimethacrylate; isopropylene and propylene glycol diacrylate and dimethacrylate. Similarly the diol diacrylates and dimethacrylates of butane, pentane, hexane, heptane and so forth through the thirty-six carbon diol are useful in the present invention as reactive diluents. Of particular interest are 1,6-hexane diol diacrylate, diethylene glycol diacrylate, trimethylol propane triacrylate, and pentaerythritol tetraacrylate.

The second component of the present invention is the saturated polyol. The polyol is required in the present invention to form the urethane linkage with the isocyanate through the hydroxyl functionality of the polyol. The urethane linkage is represented as

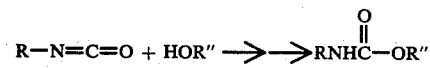

It is further required that the saturated polyol must as its name implies contain at least two hydroxy functional groups to ensure the proper degree of cross-linking during the thermal cure step.

The saturated polyol may be an alkyl or cycloalkyl polyol, an ester linked polyol, an ether linked polyol, an ether and ester linked polyol or hydroxy functional acrylic copolymers. In fact a general definition of the polyols is obtained above from the polyhydric alcohols which were condensed with the acrylic and methacrylic acid to form the reactive diluents. That is the precursor polyhydric alcohol definition for use in making the reactive diluents is identical to that of the saturated polyol.

Specific examples of alkyl and cycloalkyl polyols include 2,5-hexanediol available from Aldrich Chemical, 1,6-hexanediol, available from Celanese Chemical, ethylene glycol available from Baker, Dimerol a 36 carbon essentially linear diol available from General Mills Chemicals, Inc., glycerol, 1,2,6-hexanetriol available from Union Carbide, pentaerythritol, and 1,4-cyclohexane diol. Additional examples of such polyols include Polybd R-45HT a Butadiene diol having an approximate molecular weight of 2800 available from Arco and Trimethylol propane available from Celanese.

The ester linked saturated diols of the present invention are more particularly described as polyols where the predominate linkage (functional group other than the hydroxyl) are ester radicals. The ester linked saturated polyols are structurally represented as

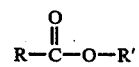

where R and R' are organic residues which contain at least two hydroxyl radicals and at least one ester link.

Examples of ester linked saturated polyols include Niax PCP0200 and PCP0240 both available from Union Carbide and having respective molecular weights of approximately 530 and 2000. Both of the foregoing compounds are diols. Niax PCP0300 also available from Union Carbide is a Caprolactone-ester triol having approximate molecular weight of 540. Niax PCP0310 also available from Union Carbide is a Caprolactone-ester triol having a molecular weight of approximately 900.

The ether linked saturated polyols of the present invention include compounds such as diethylene glycol and triethylene glycol both available from Fisher. Further ether linked saturated polyols useful in the present invention include the Polymeg Q0650, Q0100, and Q0200 all of which are ether diols available from Quaker having a respective molecular weight of approximately 650, 1000 and 2000. Pluarcol P1010 having an approximate molecular weight of 1050 available from Wyandotte is an example of a polypropylene oxide ether linked diol useful in the present invention. Similar Wyandotte products useful as saturated polyols in the present invention include Pluracol TP440 and 150 which are propylene oxide ether linked triols having respective molecular weights of approximately 425 and 1560. In similar fashion Pluaracol GP3030 is another saturated polyol suitable for the present invention available from Wyandotte. The foregoing material is a glycerine polypropylene ether linked triol having an approximate molecular weight of 2900.

Additional Pluracols useful in the present invention include Pluarcol PEP450 which is a pentaerythritol polypropylene oxide ether linked tetrol having a molecular weight of 405 and Pluracol 493 an ether linked tetrol having a molecular weight of approximately 3630.

Ester and ether linked saturated polyols suitable in the present invention are described structurally as

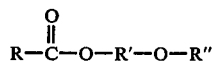

where R, R' and R" are organic residues containing at least two hydroxyl radicals and at least one ester and one ether linkage.

The remaining compositional aspect of the present invention requires the presence of an organic polyisocyanate compound. That is to assure a proper degree of cross linking with the saturated polyol the isocyanate must by definition contain at least two isocyanate functional groups. Preferably the polyisocyanate will contain from two to five, most preferably two or three isocyanate functional groups in the molecule.

Suitable polyisocyanates include ethylene diisocyanate, trimethylene diisocyanate, hexamethylene diisocyanate, propylene-1,2-diisocyanate, ethylidene diisocyanate, cyclopentylene-1,3-diisocyanate, the 1,2-, 1,3- and 1,4-cyclohexylene diisocyanates, the 1,3- and 1,4-phenylene diisocyanates, polymethylene polyphenyleneisocyanates, the 2,4- and 2,6-toluene diisocyanates, the 1,3- and 1,4-xylylene diisocyanates, bis(4-isocyanatophenyl)methane, 4,4'-diphenyl-propane diisocyanates, bis(2-isocyanatoethyl) carbonate, 1,8-diisocyanato-p-menthane, 1-methyl-2,4-diisocyanato-cyclohexane, the chlorophenylene diisocyanates, naphthalene-1,5-diisocyanate triphenylmethane-4,4',4"-triisocyanate, isopropylbenzenealpha-4-diisocyanate, 5,6-bicyclo[2.2.1] hept-2-ene diisocyanate, 5,6-diisocyanatobutylbicyclo [2.2.1]hept-2-ene and similar polyisocyanates.

Of particular interest in the present invention are trimethylene hexamethyl diisocyanate available from VEBA, heptadecyl (C17) diisocyanate, DDI 1410 an aliphatic C-36 diisocyanate available from General Mills Chemicals, Inc. (generally diisocyanates having from 12 to 40 carbons in the aliphatic radical may be used in the present invention), toluene diisocyanate available from Allied Chemical, isophorone diisocyanate available from VEBA and Desmodur N an aliphatic triisocyanate available from Mobay. Desmodur N is more particularily defined the tri-isocyanate adduct of 3 moles of hexamethylene diisocyanate and water having an isocyanate equivalent weight as later defined of 191 grams. Other adducts or prepolymers of the polyisocyanate include Desmodur L and Mondur CB which are the adducts of toluene diisocyanate. The foregoing materials have an isocyanate equivalent weight of approximately 250 grams.

In both the compositional and method aspects of the present invention the saturated polyol is present at a level of from about 40% to about 90% preferably from about 50% to about 80% by weight. The reactive diluent is present at from about 10% to about 60%, preferably from about 20% to about 80% by weight.

The amount of the polyisocyanate utilized in forming the interpenetrating compositions of the present invention is expressed as a percentage equivalent weight basis with respect to the hydroxyl functionalities of the saturated polyol. Desireably each hydroxyl functional group on the saturated polyol will react on a 1:1 stoichometric basis with the isocyanate functionality on the polyisocyanate compound. It is quite feasible however to form the urethane linkage using from about 80% to 120% preferably from about 95% to 105% on a hydroxyl-isocyanate equivalent basis of the polyisocyanate.

To determine the amount of the polyisocyanate required for a given saturated polyol the hydroxyl or isocyanate equivalent weight of the respective polyol or polyisocyanate is determined as that weight in grams of the material which contains 1 gram equivalent weight of the respective functional group. More particularly to determine the number of equivalents in a given saturated polyol the hydroxyl value is first determined by known methods and reported in milligrams of potassium hydroxide. The calculation to determine the hydroxyl equivalents is then given by the following equation:

$$\text{OH equivalent weight} = \frac{56,100}{\text{OH value}}$$

where 56,100 is the milligram equivalent weight of potassium hydroxide.

Alternatively if the weight percentage of the hydroxyl groups in the saturated polyol is known the hydroxyl equivalent is determined as follows:

$$\text{OH equivalent weight} = \frac{17 \times 100}{\text{wt \% OH}}$$

where 17 is the equivalent weight of the hydroxyl radical and the weight percent OH is the percentage of the saturated polyol which is hydroxy groups.

In similar fashion the isocyanate equivalent may be determined if the weight percent of the isocyanate functional groups in the polyisocyanate is known. This equation is given below where 42 is the molecular weight of an isocyanate functional group and the weight percent NCO is that portion of polyisocyanate made up of isocyanate functional groups.

$$\text{isocyanate equivalent weight} = \frac{42 \times 100}{\text{wt \% NCO}}$$

A highly desirable variable of the present invention is to formulate the saturated polyol and the polyisocyanate such that the sum of the isocyanate functionality and the hydroxyl functionality is greater than four. That is if the polyisocyanate is a diisocyanate then the saturated polyol should be a triol. Similarly where triisocyanates are utilized it is desirable that the saturated polyol be a diol or triol. The value of this discovery resides in the fact that in forming the interpenetrated urethane linked resin composition that a higher degree of cross-linking of the polyol and the polyisocyanate will occur under the foregoing conditions as opposed to the situation where the polyisocyanate and the saturated polyol contain the same number of functional groups. The foregoing discussion is not to be confused with the determination of the hydroxylisocyanate equivalents discussed immediately above.

In the present invention the saturated polyol and the reactive diluent are ordinarily premixed prior to the addition of the polyisocyanate component. There are two basic reasons for following this order of addition. The first reason is that the reactive diluent functions to lower the viscosity of the saturated polyol and thus permits further mixing with the polyisocyanate. In the absence of premixing the saturated polyol would often be too viscous to process. Even if the saturated polyol is of sufficiently low viscosity to permit addition of the polyisocyanate before the reactive diluent this order of addition is not preferred due to the fact the saturated polyol and the polyisocyanate can react to form the urethane linkage at room temperature. When this is the case the saturated polyol and the polyisocyanate may not be stored together for long periods of time such as in a warehouse. It is believed that when the preferred order of addition (reactive diluent and saturated polyol then polyisocyanate) is followed that the reactive diluent functions not only to lower the viscosity of the saturated polyol but also slow the urethane formation at room temperature to allow time for application to the substrate.

The second reason for mixing the saturated polyol and the reactive diluent prior to the addition of the polyisocyanate is related to the preparation of the saturated polyol in the first instance. For example when the saturated polyol is the reaction product of acrylic acid, butyl acrylate and hydroxyethyl acrylate it is necessary to include some solvent to lower the viscosity of the polyol. Toluene or xylene are preferred inert solvents for the preparation of the aforedescribed polyol. To avoid atmospheric pollution the reactive diluent is added to the mixture of the saturated polyol and the inert solvent followed by distilling off the inert solvent. The inert solvent is then recovered for reuse while the low viscosity mixture of the saturated polyol and the reactive diluent are drawn off for use in the resin composition. A preferred reactive diluent which may be added to the saturated polyol prior to distillation of the aromatic solvent is 1,6-hexanediol diacrylate.

UTILIZATION

The compositions of the present invention comprising the saturated polyol, the reactive diluent, and the polyisocyanate are applied to substrates such as wood, metal, paper, or plastics by any convenient method such as knife blade, brush, or spray. The coated surface is then exposed to sufficient radiation which may be either particulate or non-particulate radiation to cure the reactive diluent through the radiation sensitive pi bonds. Suitable sources of particulate and non-particulate ionizing radiation include ultraviolet light or radioactive sources such as are described in U.S. Pat. No. 3,935,330 issued Jan. 27, 1976 to Smith et al. To enhance the rate of radiation curing of the reactive diluent free radical initiators may be included in the composition such as benzoin, benzoin ethers, Michler's Ketone and chlorinated polyaromatic hydrocarbons. Other free radical initiators are ordinarily organic peroxides, hydroperoxides, per acids, per esters, azo compounds, ditertiary butyl peroxide, benzoyl peroxide, 2,4-dichlorobenzoyl peroxide, tertiary butyl hydroperoxide, 2,5-dimethyl-2,5-bis (hydroperoxy)-hexane, peracetic acid perbenzoic acid, tertiary butyl peroxypivalate, tertiary butyl peracetic acid and azo-bis-isobutyl nitrile. The free radical initiator may be present at from about 0.01 to about 20% by weight of the radiation curable components.

To ensure that the reactive diluent does not polymerize prior to the addition of the polyisocyanate a free radical inhibitor may be added to the mixture of the saturated polyol and the reactive diluent. Examples of suitable inhibitors include hydroquinone and the methyl ether thereof or butylated hydroxy toluene at a level of from about 5 ppm to about 2000 ppm by weight of the radiation curable components.

The amount of radiation necessary to cure the reactive diluent will of course depend on the angle of exposure to the radiation, the thickness of the coating to be applied, and the amount of reactive diluent in the coating composition as well as the presence or absence of a free radical initiating catalyst. For any given composition experimentation to determine the amount of radiation sensitive pi bonds not cured following exposure to the radiation source is the best method of determining the amount and duration of the radiation required.

The thermal curing operation is best carried out between the temperatures of about 0° to about 300° C. preferably from about 20° C. to about 200° C. To operate with a minimal amount of thermal energy expended to form the urethane linkage a catalyst may be used to promote the reaction. Examples of such urethane catalysts include triethylene diamine, morpholine, N-ethylmorpholine, dimethyl piperazine, triethylamine, N,N,N',N'-tetramethylbutane-1,3-diamine, dibutyltin dilaurate, stannous octoate, stannous laurate, dioctyltin diacetate, lead octoate, stannous oleate, stannous tallate, dibutyltin oxide, and hexabutylditin as well as other art recognized urethane catalysts. Typical levels of the urethane catalyst are from about 0.001% to about 5% by weight of the urethane linking components.

The amount of time required to effect the thermal cure in the present invention depends as in the case of the radiation cure upon the amount of the thermal cure ingredients, the thickness of the coating, and other factors intrinsic to the system. If the saturated polyol and the polyisocyanate are included in the interpenetrating compositions on a hydroxyl-isocyanate equivalent basis the rate and completeness of thermal cure may be determined by analyzing for free isocyanate or free hydroxyl presence in the coating. Where more or less than the equivalent amount of the polyol or the polyisocyanate is included in the composition the degree of thermal curing is most conveniently measured by determining the presence of the functional group present in excess of the equivalent weight versus the theoretical amount of that component which should be present following the thermal cure. In cases where the thermal cure is not completely affected additional thermal energy may be applied to complete the urethane formation.

It is recommended that experimentation be utilized to determine the proper duration required for the thermal cure. Generally the amount of time required to affect the thermal cure under normal operating conditions will be from about 1 to about 30 preferably from about 5 to about 10 minutes.

Additional components which may be included in the present invention include pigments, dyes, reflective materials and so forth. Minor amount of compounds which have both radiation sensitive pi bonds and thermally curable functional groups may be present in the resin composition. Such materials include hydroxyethyl acrylate and pentaerythritol triacrylate. Both of the foregoing components contain both acrylate and hydroxy functional groups. As long as such components are present at not more than about 10% by weight the degree of the penetration of the interpenetrated coating compositions will not be substantially affected and the inclusion of these materials may be tolerated.

The following are examples of the present invention.

EXAMPLE I

An interpenetrating radiation sensitive resin composition is prepared as follows: The following components are used to form a hydroxy functional acrylic copolymer:

|  | Parts by Weight |
| --- | --- |
| xylene | 40 |
| methyl methacrylate | 25 |
| n-butylacrylate | 25 |
| hydroxy-ethyl acrylate | 8.82 |
| ditertiary butyl peroxide | 1.18 |
|  | 100.00 |

The acrylic functional compounds are placed in a premix tank and thoroughly stirred for 10 minutes. The ditertiary butyl peroxide is added to the premix tank and then stirred for 20 minutes.

A kettle is then set for reflux conditions and the xylene is charged into the kettle with a nitrogen sparge. One tenth of the premixed acrylic monomers and the ditertiary butyl peroxide are then added into the kettle. The limited addition of premix is useful in controlling the highly exothermic acrylic polymerization.

The mixture in the kettle is then stirred and refluxed at about 135° C. for about 15 minutes. The remainder of the premix is fed in to the kettle over a period of 90 minutes with constant reflux throughout the addition. After an additional one hour period a sample of the mixture in the kettle is withdrawn to determine the solids content which for the present example should be about 60% by weight.

The reaction mass is then cooled to a temperature below about 50° C. The hydroxy functional acrylic copolymer mixture has a Gardner color of about 2, a viscosity of 30–50 poise, is clear and has a hydroxyl value of 70–75 mg KOH per gram and a hydroxyl equivalent weight of 1274.

18.520 kilograms of the reaction mass are then mixed with 2.118 kilograms of Pluracol PEP650 which has an equivalent weight of 145.7. To this mixture 5.96 grams of hydroquinone are added to inactivate any trace of the ditertiary butyl peroxide catalyst. It is preferable to add hydroquinone in a heated portion of xylene to ensure that the former material is dissolved or dispersed. 4.77 kilograms of 1,6-hexane diol diacrylate (the reactive diluent) are then added to the kettle. Heat and vacuum are then simultaneously applied to distill off the xylene. The kettle temperature at this point is between about 55° and 65° C. with the vacuum at about 20 mm Hg.

The kettle is then maintained at about 60° C. under the highest possible vacuum until xylene distillation ceases usually in about one hour at 200 microns of absolute pressure.

When the distillation is completed the vacuum is opened to air and a sample is removed and tested for solids analysis. The resultant product is a clear, water white liquid having a viscosity of about 200 poise at 50° C. The solids content following distillation of the xylene is greater than 95% and the saturated polyol in the composition has a hydroxyl value of 110. The Gardner color value is 1- and a gas liquid chromatography test indicates that only about 1.5% of the xylene remains in the mixture following distillation.

The foregoing interpenetrating radiation sensitive resin composition is mixed with any of the polyisocyanate compounds in accordance with the present invention to form the urethane linking radiation sensitive resin composition. Similar compositions are obtained where the methyl methacrylate the butyl acrylate and the hydroxyethyl acrylate are combined in a molar ratio of from about 4:1:1 to about 1:4:3.

EXAMPLE II

An interpenetrating radiation sensitive resin composition is prepared in the following manner:

The premix tank is charged with methylmethacrylate, styrene, n-butyl acrylate, and hydroxy-ethyl methacrylate and stirred for a period of about 10 minutes. Tertiary butyl perbenzoate is added as a free radical catalyst and stirring is continued for about 20 minutes.

The kettle is set for total reflux and charged with xylene as the inert solvent. Approximately 10 percent of the premix comprising the monomers and the free radical catalyst are added to the kettle. The nitrogen sparge is then set in the kettle.

The stirrer in the kettle is then activated and the kettle heated to reflux at from about 130°–135° C. under reflux conditions for a period of about 20 minutes. The remainder of the premix is fed in at a uniform rate over a period of about 4 hours maintaining reflux throughout the addition period. At about one hour after completion of the premix addition the solids and free monomer content of the composition in the kettle is determined to ensure substantial completion of the hydroxy functional acrylic copolymer. The composition in the kettle comprises:

| Contents | Parts by Weight |
| --- | --- |
| xylene | 40.00 |
| methyl methacrylate | 19.16 |
| styrene | 19.16 |
| n-butyl acrylate | 6.77 |
| hydroxy-ethyl methacrylate | 12.64 |
| tertiary butyl perbenzoate | 2.27 |
|  | 100.00 |

The mixture of the inert solvent, the free radical catalyst and the hydroxy functional acrylic copolymer containing methyl methacrylate, styrene, n-butyl acrylate, and hydroxyethyl methacrylate units form a clear mixture having a Gardner color of 3, a viscosity of 35–45 poise and a hydroxyl value of 90–95 mg KOH per gram.

The mixture is cooled to below 50° C. and the xylene is removed as in Example I and replaced with 13.61 parts of 1,6-hexane diol diacrylate as the reactive diluent.

The foregoing composition is then used to form an interpenetrating urethane-linking radiation sensitive resin composition as follows:

| Content | Parts by Weight | m.e.q. |
|---|---|---|
| Hydroxy functional acrylate copolymer | 58.9 | 95.2 |
| Desmodur-N 100 | 18.2 | 95.2 |
| V—pyrol (N—vinyl 2-pyrrolidone) | 20.8 | |
| Vicure 10 (benzoin ether photoinitiator) | 1.8 | |
| Hexabutyl ditin | 0.3 | |
| | 100.0 | |

The V-pyrol is an additional amount of reactive diluent added to the interpenetrating radiation sensitive composition to further lower the viscosity. The addition of the V-pyrol forms a stronger copolymer with the 1,6-hexane diol diacrylate following the radiation cure than does a homopolymer of the 1,6-hexane diol diacrylate and may be so varied between a ratio of 4:1 to about 1:4. The Vicure 10 is an ultraviolet initiator included at a level of 5 parts per 100 based on the total amount of reactive diluent in the composition. The hexabutyl ditin functions as a urethane catalyst and is included at a weight of 0.5 parts per 100 based on the weight of the urethane copolymer.

The foregoing interpenetrating urethane-linking radiation sensitive resin composition is then applied to a substrate and exposed to ultraviolet radiation to effect the radiation cure followed by thermal curing to give a strong high gloss interpenetrated urethane linked coating composition.

EXAMPLE III

An interpenetrated urethane-linking radiation sensitive resin composition is prepared as follows:

| Component | Parts by Weight |
|---|---|
| Hydroxy functional acrylic copolymer from Example I | 72.8 |
| 1,6-hexane diol diacrylate | 15.6 |
| Desmodur-N 100 | 18.2 |
| V—pyrol | 20.8 |
| Vicure 10 | 1.8 |
| Hexabutyl ditin | 0.3 |

The foregoing composition when treated with ionizing radiation to effect the radiation cure step and then by thermal cure to form the urethane linkage provides a strong tough coating on a substrate.

EXAMPLE IV

The following components were combined to prepare an interpenetrating urethane-linking radiation sensitive resin composition.

| Components | Source | Equivalents | Weight |
|---|---|---|---|
| Ethylene glycol | Baker Reagent Grade | 134 eq | 4.13 kg |
| Desmodur-N (Des-N) | Mobay Chem. Co. | 134 eq | 25.47 kg |
| 1,6-hexanediol diacrylate (HDODA) | Celanese Chem. Co. | | 12.8 kg |
| Vicure 10 photoinitiator | Stauffer Chem. Co. | | 0.64 kg |
| Hexabutyl ditin (HBDT) | Ventron Chem. Co. | | 0.09 kg |

The coating materials of Example IV have a reactive diluent to urethane linking component weight ratio of 3:7 while the saturated polyol and the polyisocyanate are stoichiometrically balanced. The Vicure 10 photoinitiator is present at 5 parts per 100 based on the reactive diluent (HDODA). The hexabutyl ditin is present as a urethane linking catalyst at a level of 0.3 parts per hundred based upon the combined weight of the polyisocyanate and the saturated polyol.

The coating composition formed from the present example was applied to glass, black plate, and bonderite treated steel panels with 1.5 mm doctor blade. Each of the sample panels was cured by ultraviolet exposure by feeding the plates for 5 passes each at a rate of 60 feet per minute on a moving belt past an ultraviolet light source which is a 24"-200 watt/linear inch mercury vapor lamp in air. The thermal cure to form the urethane linkage was effected in a forced air oven over a period of 5 minutes at 150° C.

The properties of the coating prepared in accordance with this example are shown in Table 1.

EXAMPLES V–XXVI

Examples V–XXVI are prepared in accordance with Example IV in the example with the exception of replacing the ethylene glycol on an equivalent basis with the saturated polyols listed below.

| Example No. | Saturated Polyol | Polyol Source | Polyol Description |
|---|---|---|---|
| V | 2,5-hexanediol | (Aldrich) | C$_6$ diol |
| VI | Dimerol | (General Mills Chemicals, Inc.) | C$_{36}$ diol |
| VII | diethylene glycol | (Fisher) | Ether diol, MW-106 |
| VIII | Triethylene glycol | (Fisher) | Ether diol, MW-150 |
| IX | Niax PCP0200 | (Union Carbide) | Ester diol, MW-530 |
| X | Niax PCP0240 | (Union Carbide) | Ester diol, MW-2000 |
| XI | Polymeg Q0650 | (Quaker) | Ether diol, MW-650 |
| XII | Polymeg Q01000 | (Quaker) | Ether diol, MW-1000 |
| XIII | Polymeg Q02000 | (Quaker) | Ether diol, MW-2000 |
| XIV | Polybd R-45HT | (Arco) | Butadiene diol, MW-2800 |
| XV | Pluracol P1010 | (Wyandotte) | PO ether diol, MW-1050 |
| XVI | Trimethylol propane | (Celanese) | |

-continued

| Example No. | Saturated Polyol | Polyol Source | Polyol Description |
|---|---|---|---|
| XVII | Pluracol TP440 | (Wyandotte) | TMP—PO ether triol, MW-425 |
| XVIII | Pluracol TP1540 | (Wyandotte) | TMP—PO ether triol, NW-1650 |
| XIX | Glycerol | (Baker) | |
| XX | Pluracol GP3030 | (Wyandotte) | Glycerine-PO ether triol, MW-2900 |
| XXI | Niax PCP0300 | (Union Carbide) | Caprolactone-ester triol, MW-540 |
| XXII | Niax PCP0310 | (Union Carbide) | Caprolactone-ester triol, MW-900 |
| XXIII | 1,2,6-hexanetriol | (Union Carbide) | |
| XXIV | Pluracol PEP450 | (Wyandotte) | Pentaerythritol-PO ether tetrol, MW-405 |
| XXV | Pluracol 493 | (Wyandotte) | Ether tetrol, MW-3630 |
| XXVI | Methyl methacrylate, n-butyl acrylate, and hydroxyethylacrylate copolymer | (General Mills Chemicals, Inc.) | Hydroxy functional acrylic copolymer prepared according to Example I |

The properties of the urethane linked coatings prepared in accordance with Examples V–XXVI are shown in Table I below.

TABLE I

VARIOUS SATURATED POLYOLS

| Example Number Polyol Name | IV Ethylene glycol | V 2,5 Hexane diol | VI Dimerol | VII Diethylene glycol | VIII Triethylene glycol | IX Niax PCP0200 |
|---|---|---|---|---|---|---|
| OH eq. wt. | 30.9 | 59.0 | 2500 | 53.06 | 75.09 | 262.0 |
| Weight in grams | 12.4 | 17.7 | 25.0 | 5.31 | 7.51 | 26.2 |
| 1,6-hexanediol diacrylate (gms) | 38.4 | 32.2 | 18.9 | 10.46 | 11.40 | 19.4 |
| Desmodur N-100 Weight in grams | 76.4 | 57.3 | 19.1 | 19.1 | 19.1 | 19.1 |
| Vicure 10 @ 5 phr | 1.92 | 1.61 | 0.95 | 0.52 | 0.57 | 0.97 |
| Hexabutyl ditin @ 0.3% | 0.27 | 0.23 | 0.13 | 0.07 | 0.08 | 0.14 |
| Solution Appearance | Hazy | | | Hazy | Hazy | Clear |
| Film Appearance | Smooth | Smooth | Smooth | Cratered | Semi-hard | Smooth |
| Adhesion % Loss Tape Test: | | | | | | |
| Black Plate | 100 | 100 | 100 | 100 | 100 | 100 |
| Bonderite 100 | 0 | 0 | 0 | 0 | 0 | 0 |
| G.E. Extensibility | | | | | | |
| Black Plate | 40–60 | 60 | 60 | 40–60 | 20–40 | 40–60 |
| Gardner - Reverse Impact | | | | | | |
| Bonderite 100 | 120–130 | 160 | 160 | 100–120 | 160 | 150–160 |
| Pencil Hardness | | | | | | |
| Scratch | 3H | H | 3H | 6H | 6H | HB |
| Cut through | 5H | 4H | 5H | 9H | 6H | H |
| Sward Rocker Hardness | | | | | | |
| % of glass | 24% | 34% | 10% | 20% | 12% | 6% |
| MIBK resistance | NA | NA | NA | NA | NA | NA |
| 24 hour chemical resistance | | | | | | |
| H2O | Soft | V.S.S. | Soft | S.Soft | S.Soft | Soft |
| 20% NaOH | NA | NA | NA | NA | NA | V.Soft |
| 40% H2SO4 | NA | NA | NA | Soft | Swollen | Soft |

| Example Number Polyol Name | X Niax PCP0240 | XI Polymeg Q0650 | XII Polymeg Q01000 | XIII Polymeg Q02000 | XIV Polybd R-45HT | XV Pluracol P1010 |
|---|---|---|---|---|---|---|
| OH eq. wt. | 1000.0 | 330.0 | 500.0 | 1001.18 | 1204.0 | 519.5 |
| Weight in grams | 25.0 | 33.0 | 30.0 | 30.0 | 24.08 | 51.95 |
| 1,6-hexanediol diacrylate (gms) | 12.8 | 22.3 | 17.8 | 15.3 | 11.96 | 30.45 |
| Desmodur N-100 Weight in grams | 4.8 | 19.1 | 11.5 | 5.7 | 3.82 | 19.1 |
| Vicure 10 @ 5 phr | 0.64 | 1.12 | 0.89 | 0.77 | 0.60 | 1.52 |
| Hexabutyl ditin @ 0.3% | 0.09 | 0.16 | 0.12 | 0.11 | 0.08 | 0.21 |
| Solution Appearance | Hazy | V.S.Haze | Clear | Hazy | Clear | |
| Film Appearance | Smooth | Smooth | Smooth | Smooth | Hazy | Hazy |
| Adhesion % Loss Tape Test: | | | | | | |
| Black Plate | 80 | 0 | 0 | 5 | 15 | 0 |
| Bonderite 100 | 0 | 0 | 0 | 0 | 0 | 0 |
| G.E. Extensibility | | | | | | |
| Black Plate | 60 | 40–60 | 60 | 40–60 | 40–60 | 60 |
| Gardner - Reverse Impact | | | | | | |
| Bonderite 100 | 160 | 160 | 160 | 160 | 160 | 160 |
| Pencil Hardness | | | | | | |
| Scratch | 5B | B | 6B | 6B | 4B | 4B |
| Cut through | 3B | HB | 3B | 5B | 3H | 5B |
| Sward Rocker Hardness | | | | | | |
| % of glass | 14% | 4% | 6% | 4% | 4% | 2% |

TABLE I-continued

VARIOUS SATURATED POLYOLS

|  |  |  |  |  |  |  |
|---|---|---|---|---|---|---|
| MIBK resistance | NA | NA | NA | NA | NA | NA |
| 24 hour chemical resistance |  |  |  |  |  |  |
| H₂O | Soft | V.Soft | V.Soft | S.Soft | Soft | Soft |
| 20% NaOH | S.Soft | Soft | S.Soft | Soft | Slight | Slight |
| 40% H₂SO₄ | S.Soft | Dissolved | Dissolved | Soft | Slight | Swollen |

| Example Number Polyol Name | XVI Trimethylol Propane | XVII Pluracol TP440 | XVIII Pluracol TP1540 | XIX Glycerol | XX Pluracol GP3030 | XXI Niax PCP0200 |
|---|---|---|---|---|---|---|
| OH eq. wt. | 44.67 | 142.0 | 525.0 | 30.67 | 972.0 | 176.4 |
| Weight in grams | 4.47 | 14.2 | 26.25 | 3.07 | 24.3 | 17.64 |
| 1,6-hexanediol diacrylate (gms) | 9.92 | 14.3 | 15.36 | 9.50 | 12.45 | 15.75 |
| Desmodur N-100 |  |  |  |  |  |  |
| Weight in grams | 19.1 | 19.1 | 9.60 | 19.1 | 4.78 | 19.1 |
| Vicure 10 @ 5 phr | 0.5 | 0.71 | 0.77 | 0.48 | 0.63 | 0.79 |
| Hexabutyl ditin @ 0.3% | 0.07 | 0.10 | 0.11 | 0.07 | 0.09 | 0.11 |
| Solution Appearance |  |  | Hazy | S.Haze | Clear |  |
| Film Appearance | Sl.rough | Smooth | V.Small bubbles | Smooth | Smooth | Rough |
| Adhesion % Loss Tape Test: |  |  |  |  |  |  |
| Black Plate | 100 | 85 | 95 | 100 | 0 | 60 |
| Bonderite 100 | 0 | 0 | 0 | 0 | 0 | 0 |
| G.E. Extensibility |  |  |  |  |  |  |
| Black Plate | 60 | 60 | 60 | 20–40 | 40–60 | 60 |
| Gardner - Reverse Impact |  |  |  |  |  |  |
| Bonderite 100 | 80–100 | 160 | 160 | 140–150 | 160 | 150–160 |
| Pencil Hardness |  |  |  |  |  |  |
| Scratch | 4H | 7H | 6B | 2H | 6B | 3H |
| Cut through | 6H | 8H | 6B | 8H | 6B | 6H |
| Sward Rocker Hardness |  |  |  |  |  |  |
| % of glass | 22% | 16% | 4% | 22% | 2% | 14% |
| MIBK resistance | NA | NA | NA | NA | NA | NA |
| 24 hour chemical resistance |  |  |  |  |  |  |
| H₂O | NA | NA | Soft | NA | Soft | Soft |
| 20% NaOH | NA | NA | S.Soft | NA | Soft | NA |
| 40% H₂SO₄ | NA | NA | Dissolved | NA | Swollen | NA |

| Example Number Polyol Name | XXII Niax PCP0310 | XXIII 1,2,6 Hexanetriol | XXIV Pluracol PEP450 | XXV Pluracol 493 | XXVI Same As Example I |
|---|---|---|---|---|---|
| OH eq. wt. | 301.3 | 45.0 | 100.7 | 913.8 | 760.0 |
| Weight in grams | 30.13 | 11.3 | 25.3 | 22.85 | 51.1 |
| 1,6-hexanediol diacrylate (gms) | 21.10 | 25.3 | 31.0 | 11.85 | 34.1 |
| Desmodur N-100 |  |  |  |  |  |
| Weight in grams | 19.1 | 47.8 | 47.75 | 4.78 | 12.8 |
| Vicure 10 @ 5 phr | 1.05 | 1.27 | 1.55 | 1.60 | 1.7 |
| Hexabutyl ditin @ 0.3% | 0.15 | 0.18 | 0.22 | 0.08 | 0.3 |
| Solution Appearance |  |  | Clear | S.Haze | Clear |
| Film Appearance | Smooth | Smooth | Smooth | Smooth | Smooth |
| Adhesion % Loss Tape Test: |  |  |  |  |  |
| Black Plate | 100 | 96 | 100 | 100 | 100 |
| Bonderite 100 | 100 | 0 | 0 | 0 | 0 |
| G.E. Extensibility |  |  |  |  |  |
| Black Plate | 40–50 | 60 | 40–60 | 20–40 | 5–10 |
| Gardner - Reverse Impact |  |  |  |  |  |
| Bonderite 100 | 150–160 | 120–130 | 160 | 160 | 15–18 |
| Pencil Hardness |  |  |  |  |  |
| Scratch | 2H | 3H | H | 6B | F |
| Cut through | 4H | 6H | 4H | 4B | 2H |
| Sward Rocker Hardness |  |  |  |  |  |
| % of glass | 4% | 28% | 28% | 4% | 30% |
| MIBK resistance | NA | NA | NA | NA | NA |
| 24 hour chemical resistance |  |  |  |  |  |
| H₂O | NA | NA | Soft | Soft | S.Soft |
| 20% NaOH | S.Soft | NA | NA | NA | NA |
| 40% H₂SO₄ | NA | NA | NA | Swollen | NA |

Table I shows a comparison of several properties of the various compositions prepared in accordance with the present invention. The solution appearance is a visual determination of the interpenetrating urethane-linking radiation sensitive resin composition prior to the curing operation. The film appearance shows the nature of the film on the substrate surface following the radiation and thermal curing operation. As the compositions of the present invention have several uses it is not necessary that solution appearance be clear or that film appearance be smooth but rather the properties of the cured compositions of the present invention may be determined from Table I to provide the desired effect.

The adhesion test determined on black plate and Bonderite gives a relative comparison of the amount of the film which may be removed from the respective substrates by a cross hatched network of tape applied over the coating and subsequently removed. A score of 100 indicates that all of the coating may be removed by the tape test while the score of 0 means that none of the coating is removed from the substrate. While most of the black plate tests indicate a 100 percent tape test score this is not necessarily bad as the black plate is the most difficult to adhere a coating on. In contrast Examples XI through XV and XX have very strong adhesion properties on black plate and may thus be used for any surface which has difficult adhesion properties. In contrast the Bonderite 100 surface ordinarily gives relatively strong adhesion to coatings and thus most of the composition of the present invention give 0 percent tape loss on this material.

The GE extensibility test is an ASTM method of determining the flexibility of the coating on the substrate. The Gardner reverse impact test on Bonderite 100 indicates the force in inch pounds required to damage a film applied to the substrate.

The pencil hardness test indicates the scratch resistance of the resin coating with 9H being the hardest and 6B being the softest. The Sward Rocker Hardness test indicates the relative hardness of the resin coating on the substrate versus that of glass.

The MIBK resistance test indicates the effect on the coating by methyl isobutyl ketone which has been rubbed on the coated substrate. Generally lightly crosslinked or incompletely cured coatings will soften under the MIBK test. The abbreviation NA in the tables indicates no affect. V, S, and SS indicate very, slightly, and slightly soft respectively.

The 24 hour chemical resistance tests indicates the the effect of water, a 20% sodium hydroxide, and a 40% sulfuric acid on the coating surface.

EXAMPLES XXVII–XXXII

Examples XXVII through XXX inclusive are identical to Example XXIV with the exception that the 1,6-hexane diol diacrylate has been replaced on equal weight basis by the reactive diluents listed below.

| Example No. | Reactive Diluent | Source |
|---|---|---|
| XXVII | 2-ethylhexyl acrylate | Rohm & Haas |
| XXVIII | Isodecylacrylate | Haven |
| XXIX | N—vinyl-2-pyrrolidone | GAF |
| XXX | Diethylene glycol diacrylate | Sartomer |
| XXXI | Trimethylol propane triacrylate | Celanese |
| XXXII | Diallyl maleate | Borden Chem. |

The properties of the compositions prepared according to the present invention for Examples XXVII through XXXII are reported in Table II below. It can be seen that the compositions defined in the examples given in Table II provide excellent coating qualities.

TABLE II

| | VARIOUS REACTIVE DILUENTS | | | | | |
|---|---|---|---|---|---|---|
| | XXVII | XXVIII | XXIX | XXX | XXXI | XXXII |
| Reactive Diluent Name | 2-Ethylhexyl acrylate | Isodecyl acrylate | N—vinyl-2-pyrrolidone | Diethylene Glycol Diacrylate | Trimethylol Propane Triacrylate | Diallyl Maleate |
| Pluracol PEP450 (OH eq. wt.) | 100.7 | 100.7 | 100.7 | 100.7 | 100.7 | 100.7 |
| Weight in (gms) | 10.7 | 10.7 | 10.7 | 10.7 | 10.7 | 10.7 |
| Reactive Diluent (gms) | 12.5 | 12.5 | 12.5 | 12.5 | 12.5 | 12.5 |
| Desmodur N100 Weight in (gms) | 19.1 | 19.1 | 19.1 | 19.1 | 19.1 | 19.1 |
| Vicure 10 @ 5 phr | 0.63 | 0.63 | 0.63 | 0.63 | 0.63 | 0.63 |
| Hexabutyl ditin @ 0.3% | 0.09 | 0.09 | 0.09 | 0.09 | 0.09 | 0.09 |
| Solution Appearance | Clear | Hazy | Clear | Clear | Clear | Clear |
| Film Appearance | V.Hazy | V.Hazy | V.S.Craters | Smooth | Smooth | Smooth |
| Adhesion % Loss Tape Test: | | | | | | |
| Black Plate | 100 | 100 | 0 | 70 | 100 | 0 |
| Bonderite 100 | 0 | 0 | 0 | 0 | 0 | 0 |
| G.E. Extensibility | | | | | | |
| Black Plate | 20–40 | 20–40 | 60 | 40–60 | 10–20 | 40–60 |
| Gardner Reverse Impact | | | | | | |
| Bonderite 100 | 160 | 160 | 160 | 160 | 75–80 | 160 |
| Pencil Hardness | | | | | | |
| Scratch | H | F | 3H | 2H | 3H | F |
| Cut through | 2H | H | 6H | 5H | 6H | F |
| Sward Rocker Hardness | | | | | | |
| % of glass | 26 | 14 | 30 | 30 | 40 | 2 |
| MIBK resistance | NA | NA | NA | NA | NA | S.Soft |
| 24 hour chemical resistance | | | | | | |
| H$_2$O | S.Soft | S.Soft | Soft | S.Soft | V.S.Soft | Soft |
| 20% NaOH | NA | NA | NA | NA | NA | V.Soft |
| 40% H$_2$SO$_4$ | S.Soft | V.S.Soft | V.Soft | NA to V.V.S.Soft | NA | Soft |

EXAMPLES XXXIII–XXXVII

The following Examples are identical to the composition of Example XXIV with the exception that the polyisocyanate in Example XXIV has been replaced on an equivalent basis with the materials listed below.

| Example No. | Polyisocyanate | Source and Description |
|---|---|---|
| XXXIII | trimethyl hexamethylene diisocyanate | VEBA - aliphatic C-9 diisocyanate |
| XXXIV | C17(NCO)2 | GMCI - aliphatic C17 diisocyanate |
| XXXV | DDI 1410 | GMCI - aliphatic C36 diisocyanate |
| XXXVI | IPDI | VEBA - isophorone diisocyanate |
| XXXVII | TDI | Allied - toulene diisocyanate |

The properties of the compositions prepared above are reported in Table III.

TABLE III

VARIOUS POLYISOCYANATES

| Isocyanate Name | XXXIII TMDI | XXXIV C17(NCO)2 | XXXV DDI® 1410 | XXXVI IPDI | XXXVII TDI |
|---|---|---|---|---|---|
| Equivalent weight | 105.1 | 161.0 | 302.1 | 111.2 | 87.1 |
| Equivalents | .1 | .1 | .1 | .1 | .1 |
| Weight (gms) | 10.51 | 16.1 | 30.21 | 11.12 | 8.71 |
| Pluracol PEP450 | 10.07 | 10.07 | 10.07 | 10.07 | 10.07 |
| 1,6-hexanediol diacrylate | 8.82 | 11.22 | 17.26 | 9.08 | 8.05 |
| Vicure 10 | 0.44 | 0.56 | 0.86 | 0.45 | 0.40 |
| Hexabutyl ditin | 0.06 | 0.08 | 0.12 | 0.06 | — |
| Solution Appearance | Clear (low visc) | S.Haze (low visc) | V.Hazy (low visc) | Clear (low visc) | Clear (low visc) |
| Film Appearance | Some Craters | Grainy | S.Hazy | Smooth | Smooth |
| Adhesion % Loss Tape Test: | | | | | |
| Black Plate | 65 | 15 | 75 | 50 | 100 |
| Bonderite 100 | 0 | 3 | 10 | 0 | 0 |
| G.E. Extensibility | | | | | |
| Black Plate | 40–60 | 60 | 40–60 | 40–60 | 60 |
| Gardner Reverse Impact | | | | | |
| Bonderite 100 | 160 | 160 | 160 | 160 | 160 |
| Pencil Hardness | | | | | |
| Scratch | F | H | F | 4H | 4H |
| Cut through | 5H | H | F | 6H | 7H |
| Sward Rocker Hardness | | | | | |
| % of glass | 36 | 8 | 2 | 46 | 56 |
| MIBK Resistence | NA | NA | V.S.Soft | NA | NA |
| 24 hour chemical resistance | | | | | |
| $H_2O$ | NA | NA | NA | NA | NA |
| 20% NaOH | S.Soft | S.Soft | Soft | NA | NA |
| 40% $H_2SO_4$ | NA | NA | NA | NA | NA |

The compositions reported in Table III show that desirable coatings are obtained through the use of various polyisocyanates when the compositions are formed in accordance with the methods of the present invention.

EXAMPLES XXXVIII–XLIII

The above examples are identical to Example XXIV with the exception that the present examples have been varied in the content of the reactive diluent (radiation curable) to the urethane linked components (thermal curable).

| Example No. | Percent Radiation Curable | to Urethane Linked (Thermal Cure) |
|---|---|---|
| XXXVIII | 100 | 0 |
| XXXIX | 80 | 20 |
| XL | 60 | 40 |
| XLI | 40 | 60 |
| XLII | 20 | 80 |
| XLIII | 0 | 100 |

The results obtained in forming the above compositions are reported in Table 4 below.

TABLE IV

RATIO VARIATIONS (RADIATION CURABLE TO THERMAL CURABLE)

| Example Number | XXXVIII | XXXIX | XL | XLI | XLII | XLIII |
|---|---|---|---|---|---|---|
| Percent - Radiation Cure | 100 | 80 | 60 | 40 | 20 | 0 |
| to Thermal Curable | 0 | 20 | 40 | 60 | 80 | 100 |
| Desmodur N-100 | | | | | | |
| Equivalent | — | .1 | .1 | .1 | .1 | .1 |
| Weight (gms) | — | 19.1 | 19.1 | 19.1 | 19.1 | 19.1 |
| Pluracol PEP 450 (Eq. Wt.) | — | 100.7 | 100.7 | 100.7 | 100.7 | 100.7 |
| Weight (gms) | — | 10.07 | 10.07 | 10.07 | 10.07 | 10.07 |
| 1,6-hexanediol diacrylate | 20.0 | 116.7 | 43.76 | 19.45 | 7.29 | — |
| Vicure 10 | 1.0 | 5.83 | 2.19 | 0.97 | 0.36 | — |
| Hexabutyl ditin | — | 0.099 | 0.088 | 0.088 | 0.088 | 0.088 |
| Solution Appearance | Clear (low visc) | Clear | Clear | Clear | S.Haze | Hazy |
| Film Appearance | Smooth | Smooth | Smooth | Smooth | Smooth | Wrinkled |
| Adhesion % Loss Tape Test: | | | | | | |
| Black Plate | 100 | 100 | 100 | 100 | 85 | 10 |
| Bonderite 100 | 5 | 0 | 0 | 0 | 0 | 0 |
| G.E. Extensibility | | | | | | |
| Black Plate | 2–5 | 2–5 | 20–40 | 20–40 | 60 | 60 |
| Gardner Reverse Impact | | | | | | |
| Bonderite 100 | 4 | 4 | 120–130 | 80–100 | 130–140 | 160 |
| Pencil Hardness | | | | | | |
| Scratch | 3H | 3H | 2H | 4H | H | F |
| Cut through | 4H | 5H | 5H | 6H | 5H | 5H |
| Sward Rocker Hardness | | | | | | |
| % of glass | 12 | 42 | 52 | 40 | 36 | 32 |
| MIBK resistance | NA | NA | NA | NA | NA | NA |
| 24 Hour Chemical Resistance | | | | | | |
| $H_2O$ | V.S.Soft | NA | NA | NA | NA | NA |
| 20% NaOH | S.Soft | V.S.Soft | NA | NA | V.S.Soft | S.Soft |

TABLE IV-continued

| RATIO VARIATIONS (RADIATION CURABLE TO THERMAL CURABLE) | | | | | | |
|---|---|---|---|---|---|---|
| Example Number | XXXVIII | XXXIX | XL | XLI | XLII | XLIII |
| 40% H$_2$SO$_4$ | NA | NA | NA | NA | NA | NA |

The above results reported in Table IV indicate that particularly desirable interpenetrated urethane linked coating compositions are obtained when the weight ratio of the radiation curable to the thermal curable components is from about 80:20 to about 20:80.

As previously stated the compositions of the present invention form tough, hard coatings from a low viscosity interpenetrating radiation sensitive resin composition which cures substantially free from solvent emission.

What is claimed is:

1. A method for forming an interpenetrated urethane linked coating composition on a substrate involving the steps of radiation and thermal curing by:
   (a) preparing a mixture containing:
      (1) from about 40 percent to about 90 percent by weight of a saturated polyol; and
      (2) from about 10 percent to about 60 percent by weight of a reactive diluent having a radiation sensitive pi bond and a boiling point greater than benzene and mixtures thereof; and
      (3) from about 80 percent to about 120 percent on a hydroxyl-isocyanate equivalent basis of a polyisocyanate;
   (b) applying the mixture to a substrate subjecting the coating so formed to sufficient radiation to polymerize the reactive diluent thereby partially curing the coating; and
   (c) then exposing the partially cured coating of (b) to sufficient thermal energy to form the urethane link, thereby forming the interpenetrated cured coating on the substrate.

2. The method of claim 1 wherein the sum of isocyanate functionality is greater than four.

3. The method of claim 2 wherein the saturated polyol is a hydroxy functional copolymer of (a) methyl methacrylate, (b) butyl acrylate, and (c) hydroxyethyl acrylate.

4. The method of claim 3 wherein the polyisocyanate is a di- or trifunctional isocyanate.

5. The method of claim 4 wherein the polyisocyanate is selected from the group consisting of:
   (a) toluene diisocyanate;
   (b) xylene diisocyanate;
   (c) isophorone diisocyanate;
   (d) hexamethylene diisocyanate;
   (e) the triisocyanate condensation product of hexamethylene diisocyanate and water;
   (f) trimethyl hexamethylene diisocyanate; and,
   (g) aliphatic diisocyanates having from 12 to 40 carbon atoms in the aliphatic moiety, and, mixtures thereof.

6. The method of claim 1 wherein the reactive diluent is 1,6-hexanediol diacrylate.

7. The method of claim 6 wherein the reactive diluent is a mixture of 1,6-hexanediol diacrylate and N-vinyl-2-pyrrolidone in a respective weight ratio of from about 4:1 to about 1:4.

8. The method of claim 7 wherein the radiation is ultraviolet.

9. The method of claim 8 wherein a free radical initiator is present.

10. The method of claim 8 wherein the thermal energy is applied at a temperature range of from about 0 degrees to about 300 degrees C.

11. The method of claim 7 wherein the radiation is electron beam.

12. The method of claim 1 wherein the reactive diluent is selected from the group consisting of:
   (a) 1,6-hexane diol diacrylate;
   (b) ethylene glycol diacrylate;
   (c) trimethylol propane triacrylate;
   (d) triethylene glycol diacrylate;
   (e) neopentyl diol diacrylate; and
   (f) pentaerythritol tetraacrylate,
   and mixtures thereof.

* * * * *